US009575487B2

(12) United States Patent
Lundy et al.

(10) Patent No.: US 9,575,487 B2
(45) Date of Patent: Feb. 21, 2017

(54) COMPUTER PROGRAM, METHOD, AND SYSTEM FOR OPTIMIZED KIT NESTING

(71) Applicant: Wasber Industries LLC, Independence, MO (US)

(72) Inventors: Michael D. Lundy, Independence, MO (US); Raymond S. Postlethwait, Sibley, MO (US)

(73) Assignee: Wasber Industries LLC, Independence, MO (US)

( * ) Notice: Subject to any disclaimer, the term of this patent is extended or adjusted under 35 U.S.C. 154(b) by 594 days.

(21) Appl. No.: 14/078,032

(22) Filed: Nov. 12, 2013

(65) Prior Publication Data

US 2014/0130459 A1  May 15, 2014

Related U.S. Application Data

(60) Provisional application No. 61/725,259, filed on Nov. 12, 2012.

(51) Int. Cl.
*B65B 5/06* (2006.01)
*G05B 19/418* (2006.01)
*H04L 29/08* (2006.01)

(52) U.S. Cl.
CPC ............... *G05B 19/41865* (2013.01); *G05B 2219/35162* (2013.01); *H04L 67/12* (2013.01); *Y02P 80/40* (2015.11)

(58) Field of Classification Search
CPC .......................................... G05B 2219/35162
USPC ............................................. 700/95; 53/147
See application file for complete search history.

(56) References Cited

U.S. PATENT DOCUMENTS

| 5,748,762 A * | 5/1998 | Guez ............... B26D 5/00 382/111 |
| 6,009,353 A * | 12/1999 | Nakamura ......... G05B 19/4068 700/172 |
| 6,470,228 B1 * | 10/2002 | Turner ............... G06Q 10/087 700/107 |
| 6,675,059 B2 * | 1/2004 | Scott ................ G05B 19/4097 700/166 |
| 7,065,420 B1 * | 6/2006 | Philpott ............. G06Q 30/02 700/97 |

(Continued)

FOREIGN PATENT DOCUMENTS

JP           2010181941 A  *  8/2010

*Primary Examiner* — Mohammad Ali
*Assistant Examiner* — Emilio J Saavedra
(74) *Attorney, Agent, or Firm* — Hovey Williams LLP

(57) ABSTRACT

A method, computer program, and system for optimizing kit nesting. The method, computer program, and system include defining a priority for each kit in a plurality of kits. Each of the plurality of kits is associated with at least one machine in a machine family, such that each machine family is associated with a set of kits. A first optimized nest is determined for each machine in each machine family by providing all machine-compatible parts in the highest priority kit to a nesting engine, allowing the nesting engine access to one or more subsequent priority kits to be arranged into the first nest. A second optimized nest is determined for at least one machine by providing all remaining machine-compatible parts in the highest priority kit to a nesting engine, allowing the nesting engine access to one or more subsequent priority kits to be arranged into the second nest.

6 Claims, 4 Drawing Sheets

(56) References Cited

U.S. PATENT DOCUMENTS

| | | | | |
|---|---|---|---|---|
| 2007/0150083 A1* | 6/2007 | Kanazawa | ....... | G05B 19/41865 700/100 |
| 2009/0030542 A1* | 1/2009 | Lindstrom | ......... | G05B 19/4189 700/113 |
| 2012/0078405 A1* | 3/2012 | BenBassat | ............. | G06Q 10/06 700/100 |

* cited by examiner

COMPUTER PROGRAM, METHOD, AND SYSTEM FOR OPTIMIZED KIT NESTING

RELATED APPLICATION

This non-provisional patent application claims priority benefit, with regard to all common subject matter, of earlier-filed U.S. Provisional Patent Application No. 61/725,259, filed Nov. 12, 2012, and entitled "COMPUTER PROGRAM, METHOD, AND SYSTEM FOR OPTIMIZED KIT NESTING." The identified earlier-filed provisional patent application is hereby incorporated by reference in its entirety into the present application.

FIELD

Embodiments of the present invention are directed to a computer program, method, and system for optimized kit nesting. In particular, embodiments of the present invention are directed to a computer program, method, and system that manage the production of kit parts to optimize manufacturing efficiency while maintaining various production priorities.

RELATED ART

Numerous nesting processes and strategies directed to optimizing efficiencies in the production and manufacture of parts and assemblies currently exist. Nesting is a process of efficiently producing parts from raw material, such as sheet metal. For instance, block nesting arranges rectangular outlines of part shapes on the raw material. Similarly, profile or shape nesting arranges actual part shapes on the raw material. Once the profile, shapes, or block outlines are nested, the parts may be cut from the raw material using off-line blanking dies, lasers, plasma, punches, shear blades, ultrasonic knives, water jet cutters, or the like. To promote efficient production and material usage, profiles or shapes of the parts are pre-arranged on the raw material in closely-spaced positions and orientations. Such pre-arranging of the part shapes promotes material efficiency by reducing scrap material that is produced after the parts are cut from the raw material.

Many nesting algorithms are currently in use that arrange (or "nest") the shapes of parts efficiently on the raw material. For instance, first fit algorithms nest the shapes of parts on raw material by continually placing the largest fitting available part on the raw material. Alternatively, other nesting algorithms determine the most efficient placement of parts on the raw material based solely on minimizing material waste, regardless of the size of available parts.

When producing parts included in a kit or an assembly, all of the parts need to be produced together such that when the kit or assembly parts are completed, they can be assembled together or shipped as a unit. However, standard nesting strategies do not provide optimal efficiencies for the production of kit and/or assembly parts. Inefficiencies arise because standard nesting strategies focus on the production of parts for single kits and do not optimize the production of parts for multiple kits across multiple machines and/or production lines. Thus, material efficiency is reduced when applying standard nesting algorithms to kit and/or assembly production.

SUMMARY

Embodiments of the present invention provide for a computer program, method, and system for efficiently managing the production of parts included in a kit or kits. A kit is generally a grouping of parts based on a given criteria such as product type, due date, material, common tooling, priority, machine constraints, Kanban groupings, Order Point groupings, or other related criteria. For instance, kits that are each due for shipping on a particular due date may be grouped together in a time bucket as a single kit. However, one of the more common criteria for grouping parts into a kit is by product. For instance, each of the individual parts of a widget may be combined into a single kit. Thus, embodiments of the invention may initially focus on the production of product grouped kits. However, it should be understood that embodiments of the present invention can be similarly applied to kits grouped by any criteria, as may be required. As further detailed in the description below, embodiments of the invention are directed to the real-time analysis, management, and dynamic redefinition of kits, so that the efficient production of a plurality of kits is maximized amongst all phases of the changing production cycle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
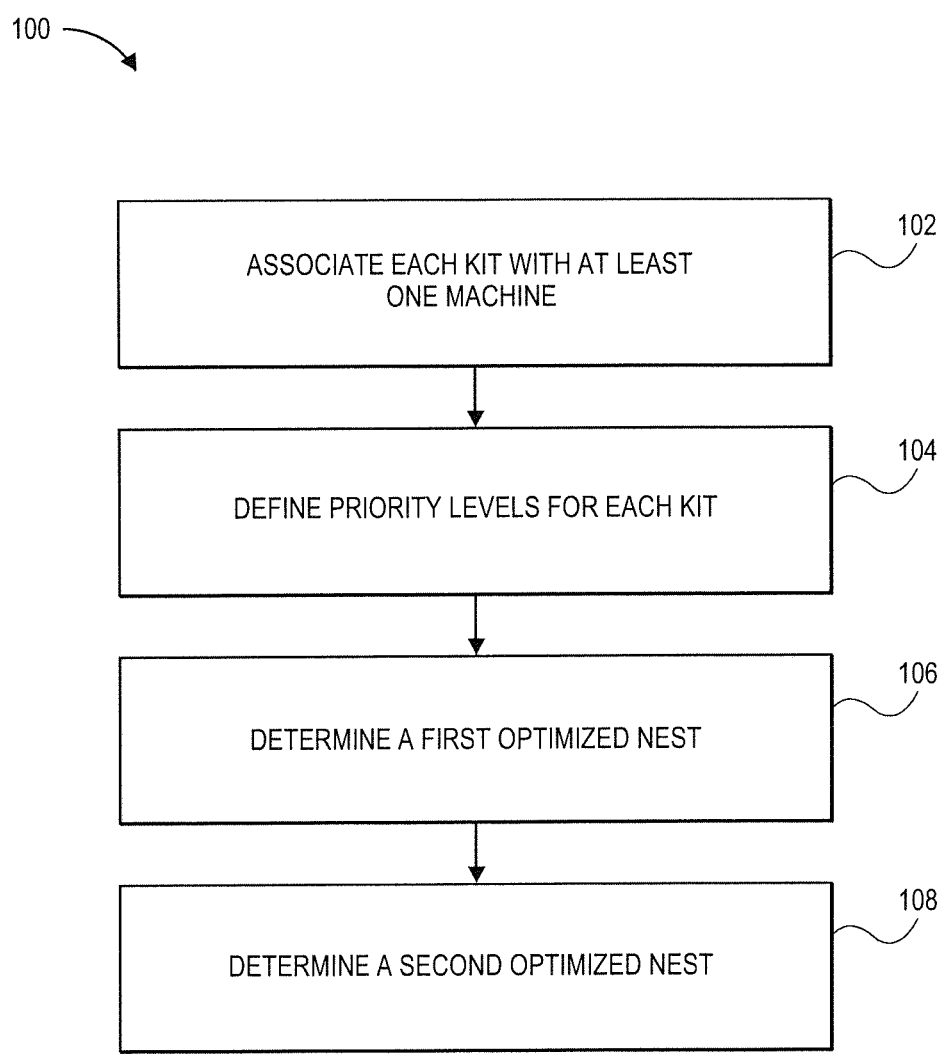
FIG. 1 is a flow chart of a method of optimizing kit nesting.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are directed to a computer program, method, and system for efficiently managing the production of parts included in a kit or kits. A kit is simply a grouping of parts based on a given criteria such as product type, due date, material, common tooling, priority, machine constraints, Kanban groupings, Order Point groupings, or other related criteria. For instance, kits that are each due for shipping on a particular due date may be grouped together in a time bucket as a single kit. However, one of the more common criteria for grouping parts into a kit is by product. For instance, each of the individual parts of a widget may be combined into a single kit. Thus, the description will focus on the production of product grouped kits. However, it should be understood that embodiments of the present invention can be similarly applied to kits grouped by any criteria, as may be required.

As illustrated in FIG. 1, embodiments of the present invention may include a method 100 with an initial Step 102 of associating each of a plurality of kits with at least one machine based on machine characteristics, such that each machine is associated with a set of kits. Embodiments of the present invention may be provided a global priority list for all machine groups. In Step 104, a priority level for the set of kits for each machine is defined. Upon defining the priority levels, the next Step 106 includes determining a first optimized nest for the set of kits for each machine based on at least the priority level of the set of kits for each machine, wherein the optimized nest for the set of kits for each machine may change at any time throughout a manufacturing cycle, such that each said optimized nest for the set of kits for each said machine is a first optimized nest. Finally, the remaining Step 108 includes determining a second optimized nest during the manufacturing cycle for at least one kit in a set of kits for a particular machine, wherein the optimized nest for a kit in a set of kits for a particular machine can be changed at any time during the manufacturing cycle based on production factors.

System Description

Figure 2:
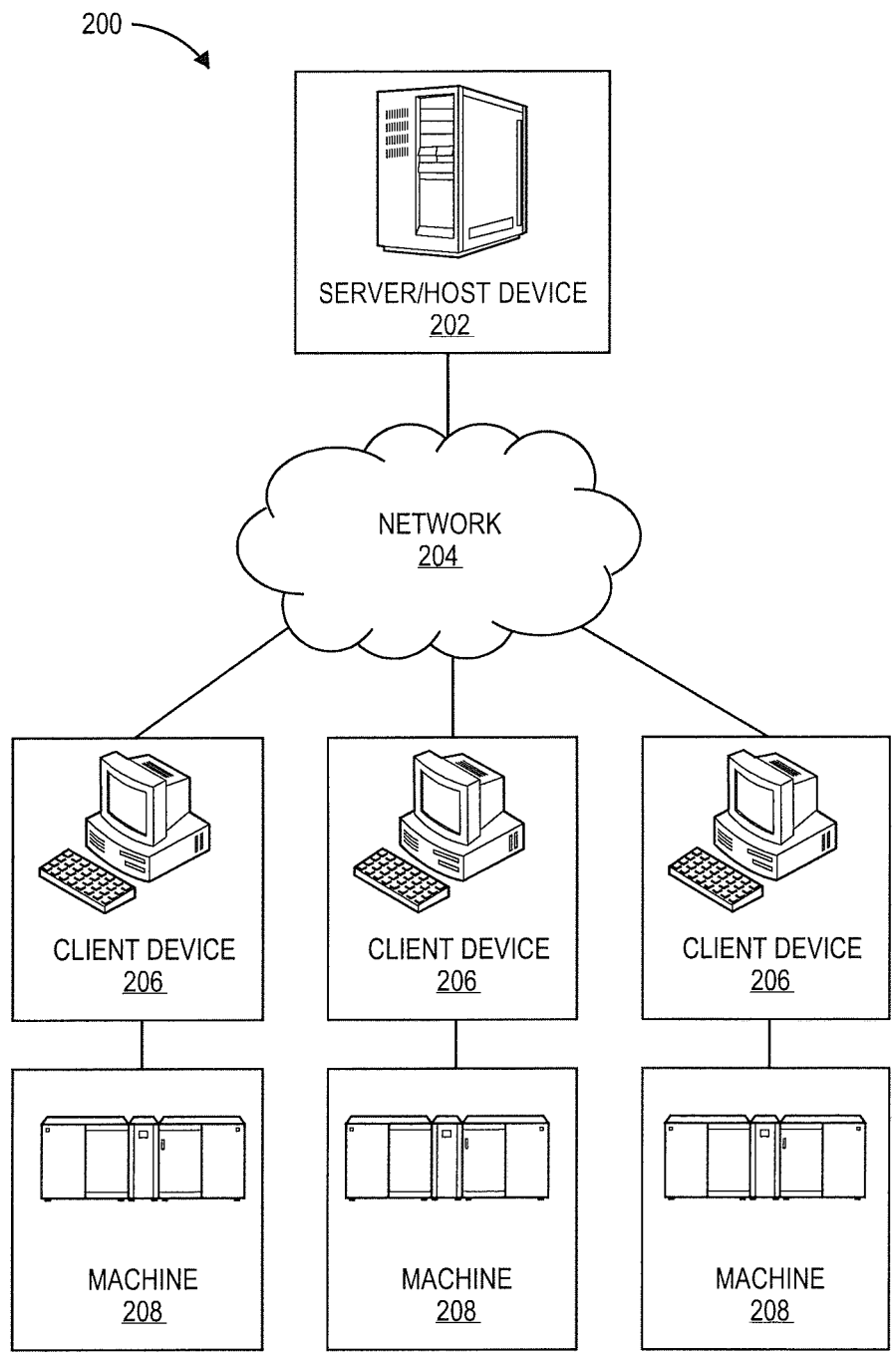
FIG. 2 is a functional block diagram of an exemplary operating environment in which an embodiment of the invention can be implemented.

Embodiments of the present invention are related to manufacturing. The computer program in accordance with embodiments of the present invention may be implemented via computing devices that are installed on, communicate with, or that otherwise control, specific pieces of manufacturing equipment or machines. In certain embodiments, the computer program may be installed on a computing device that controls a single manufacturing machine. In additional embodiments, the computer program may be installed on a computing device that controls a plurality of manufacturing machines. In even further embodiments, the computer program may be installed on a host computing device that communicates with secondary or client computing devices via a communications network. In a centralized optimization system 200, the embodiment illustrated in FIG. 2, a host computing device 202 may control or send direction over a communications network 204 to secondary or client computing devices 206 that control a plurality of manufacturing machines 208. The host computing device 202 may serve as repositories for data and programs used to implement certain aspects of the present invention as described in more detail below. The host computing device 202 may include any type of computing device(s), such as networks or server computers, and may be connected to a firewall to prevent tampering with information stored on or accessible by the computers. The functionality of the host or client computing device 202,206 may also be distributed among many different computing devices or may be implemented in a cloud computing environment.

Exemplary computing devices, client and host computing devices 202,206 may include a plurality of electronic devices that communicate with or control manufacturing machines 208, such as manufacturing machine computers, smartphones, tablet computers, laptop computers, desktop computers, servers, and other computing devices. The computer program and computing devices illustrated and described herein are merely examples of programs and computing devices that may be used to implement aspects of embodiments of the invention and may be replaced with other programs and computing devices without departing from the scope of the invention.

Embodiments of the present invention may include a processing element that generally executes the computer program, wherein the computer program is also commonly known as instructions, commands, software code, executables, applications, apps, and the like. The processing element may include processors, microprocessors, microcontrollers, field-programmable gate arrays (FPGAs), or the like, as well as combinations thereof. The computer program associated with the processing element may include instructions that direct the processing element to perform the methods and processes of embodiments of the present invention, such as for example generating efficient kit nests, disseminating the nests for each machine, and directing the manufacturing machines.

Embodiments of the present invention may additionally include memory elements that generally store the computer program as well as data associated with the generation of kit nests. The memory element may also be known as a "computer-readable storage medium" and may include non-transitory components such as random access memory (RAM), read only memory (ROM), flash drive memory, hard disk drives, or the like, as well as combinations thereof. The memory element may be in electronic communication with the processing element, such that the processing element may access the computer program associated with the processing element and data in the memory element in a manner known in the art. In some embodiments, a portion or the entire computer program may be stored externally, in an external computing device, but may be accessible to the processing element through the communications network. In even further embodiments of the present invention, the processing element and the memory elements may reside within an integrated circuit, as is known in the art.

The communications network 204 generally allows the computing device, host or client computing device 202,206, processing element, and memory to intercommunicate and to communicate with external devices, systems, computers, or networks. The communications network 204 may include wired connection, such as with electrically conductive cables or optical fibers, or, in preferable embodiments, a wireless connection, such as with radio frequency (RF) transmitters and receivers utilizing wireless communication protocols like Bluetooth®, WiFi, WiMAX, etc. Use of the communications network allows information and data stored on the memory element to be uploaded or otherwise transmitted to said external devices, systems, computers, or networks. Moreover, use of the communications network 204 allows software updates to be downloaded to the memory element for implementation of code segments of the computer program associated with the processing element and stored on or associated with the memory element. In certain embodiments, the communications network 204 may include the Internet, but it may also include any other communications network, such as a local area network, a wide area network, a wireless network, or an intranet. The communications network 204 may also be a combination of several networks. For example, the host computing devices 202 may wirelessly communicate via a Wi-Fi network with the client computing device 206, which in turn is in communication with one or more of the manufacturing machines 208 via a hard-wire communications network.

The computer program of the present invention is stored in or on computer-readable medium residing on or accessible by the computing device. The computer program preferably comprises ordered listings of executable instructions for implementing logical functions in the host computing devices, computing devices, and/or manufacturing machines. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Operation

As initially stated, embodiments of the present invention are directed to a computer program, method, and system for efficiently managing and optimizing the production of parts included in a kit or kits. Specifically, embodiments of the present invention are directed to efficiently nesting the kit parts on a raw material for processing and/or manufacture by a particular machine or groups of machines in real-time. Further, embodiments of the present invention are directed to dynamic nesting of parts from a plurality of kits on raw materials.

Embodiments of the invention make real-time adjustments to the production process to efficiently manage and produce parts from a plurality of kits. Production factors such as the completion of a kit, the completion of a product, the minimum and/or maximum allowable number of kits on a particular machine, changes in priority levels, changes in order quantities, changes in product due dates, part additions, part revisions, part cancellations, product additions, product revisions, product cancellations, the availability of filler parts from other kits, the availability of a particular material, the availability of a particular machine, material efficiency, part sizes, weights, material costs, monetary savings compared to an efficiency threshold, and the tooling of a particular machine, may all affect overall efficiency during the production process. Embodiments of the invention take into consideration any or all of the above listed factors, in real-time, and make optimizations to the nests processed or to be processed by any or every machine involved in the production. Production factors related to the status or priority of a kit, product, order, or part, either changed manually by the user or as a result of the manufacturing process, may initiate the determination of a new optimized nest at any point during the manufacturing cycle. Production factors related to the above statuses may be a result of completions, cancellations, revisions, or additions thereof. Production factors related to manufacturing limitations, or manufacturing capability factors, may also initiate determinations of new optimized nests at any point during the manufacturing cycle. For example, part availability, material availability, tooling availability, and/or machine states, may all be qualified manufacturing capability factors related to manufacturing limitations.

Initially, each kit that is to be manufactured is defined and given a priority. In some embodiments, the kit with the highest priority is defined as a primary kit and all other kits are defined as subordinate kits. In addition to primary and subordinate kits, there may also be unconsidered kits and filler kits, which will each be discussed in more detail below. The primary kit is given the overall highest priority because of various potential considerations, such as due date, ship date, completion time, available parts, required materials, machine constraints, or other production factors described herein. Once a kit has been defined as the primary kit, it does not relinquish its status until the production of all of the parts of the primary kit has been completed. Thus, if primary kit parts are available to be produced, they are never bumped for lower priority kit parts, such as from subordinate or filler kits.

Each of the subordinate kits ranks lower in priority than the primary kit. Additionally, each subordinate kit is given a priority, such that there exists a linear progression of subordinate kits, from a highest priority subordinate kit to a lowest priority subordinate kit. Embodiments may define priority levels for each kit with a unique and sequential level of priority, such that no two kits in one set of kits share the same priority level. Upon completion of all of the parts in the primary kit, the highest priority subordinate kit becomes the primary kit and each of the remaining subordinate kits correspondingly increase one unit of priority. It should be noted that the status of the kits is defined per machine or groups of machines. Thus, although it is possible for a product (i.e., a widget) to include multiple parts that are produced on multiple machines, each kit as defined herein corresponds to those parts of the product that are produced on a particular machine or group of machines. Thus, simply because a kit has been completed, does not mean that all of the parts of the product have been completed. It simply means that the parts of the product that are produced by the particular machine or groups of machines (i.e., the kit) have been completed.

Although there is only one primary kit, the number of subordinate kits may be determined as necessary and as required by machine and/or logistical constraints. The number of kits available to the nesting system may be determined by the number of open orders or open kits that can be handled by any one machine or groups of machines at a time.

For instance, because kits are defined by machine or groups of machines, a minimum number of allowable kits can be defined for any particular machine or group of machines. Based on the defined number of minimum allowable kits, there should exist at least enough open subordinate kits, along with the primary kit, to ensure that the number of open kits does not fall below the minimum allowable number. Similarly, a maximum number of allowable kits can be defined for any particular machine or group of machines. Based on the defined number of maximum allowable kits, there should exist no more open subordinate kits, along with the primary kit, to ensure that the number of open kits stays below the maximum allowable number.

In addition to primary and subordinate kits, there may exist filler kits and unconsidered kits. Unconsidered kits are kits that need to be produced, but because the number of open kits is at the maximum allowable number for the particular machine or group of machines, the unconsidered kits are not accounted for or opened. However, consider for example a situation in which the total number of open kits, including the primary kit and all subordinate kits, is at the maximum allowable number for a particular machine or group of machines. Once the primary kit for the particular machine or group of machines has been completed, the subordinate kits will each move up a unit of priority, thus leaving room for one additional kit to be added to the machine or group of machine's total number of open kits to reach the maximum allowable number of kits. In such an example, an unconsidered kit may then be reclassified as a subordinate kit, and more precisely, the lowest priority subordinate kit.

Alternatively, filler kits are kits that only exist to be filler parts for the nests of primary and/or subordinate kits. A filler kit can contain one or more parts. For example, certain parts that are easily produced from the scrap of other nests can be grouped into filler kits, which can then be produced as required or as scheduled. The production requirements for parts in filler kits can be controlled through standard Kanban or Order Point processes.

After defining each type of kit, embodiments of the present invention broadly provide a method and process for optimally producing kits and their corresponding parts. For example, embodiments of the present invention minimize tail off encountered during production of kits. Tail-off occurs because kits include only a finite number of parts. As the parts of a kit are produced and completed, there are fewer parts from the kit available to efficiently nest on the raw materials. With fewer parts to nest, the opportunity to maximize material efficiency is reduced because there are fewer parts to efficiently arrange on each raw material. Take for example a primary kit with 1,000 parts. Before any of the primary kit parts are produced, there are 1,000 parts which can be selectively nested on a raw material. Because of the large number of parts to choose from, there is a very high probability that the parts of the primary kit can be nested on a raw material in a highly efficient manner. However, consider that after 950 of the primary kit parts have been produced, there are only 50 parts of the kit left to produce. Thus, there are far less parts to choose from to nest on a raw material. With fewer parts to choose from, it becomes more difficult to efficiently nest parts, resulting in an overall increase in material waste.

Embodiments of the present invention counter this inefficiency by blending parts from subordinate kits and filler kits into the nest of the primary kit. For instance, given the example above with a primary kit with 50 parts remaining to be produced, once all of the primary kit parts that can be nested on the additional raw material have been nested, embodiments of the present invention turn to the highest priority subordinate kit to determine whether it has any kit parts that can be nested on the raw material along with the primary kit parts. Embodiments of the present invention examine each of the remaining open subordinate kits and filler kits in priority order until no further parts can be nested. A test for determining a predefined minimum efficiency is subsequently performed. If the minimum efficiency has not been reached, filler kits for the machine are updated as new kits up to a prespecified number are opened. However, once the minimum efficiency has been reached, the nest is accepted and the additional raw material is processed by the machine or groups of machines. Thus, embodiments of the present invention optimize material efficiencies and reduce tail-off by blending or merging the production of parts across kits of differing types and differing priorities. As parts for a particular kit begin to reduce, then parts from additional kits are merged into the nest to increase material efficiency.

Because embodiments of the invention are operable to optimize nests for a plurality of machines in real-time, the invention can be incorporated with various nesting techniques, such as batch nesting or just in time (JIT) nesting. JIT nesting is a technique where nesting is performed just before the nest is sent to the machines or groups of machines for processing. For instance, once a machine has nearly finished with its current job, it requests a new nest. With JIT nesting, the new nest is determined at the last possible moment, just before the nest is sent to the machine. Thus, JIT is advantageous in that it can incorporate last minute changes due to scheduling, materials, logistics, or the like. However, embodiments of the present invention can also be used in a batch nesting environment. Batch nesting incorporates the use of multiple nests, potentially over multiple raw materials, which reflect the production of many kits or part orders. In batch nesting, the requests for new nests are generated from a nesting system as opposed to the machines that are performing the work. The following example is provided with reference to JIT nesting; however, it is understood that the following example could be incorporated with any standard nesting techniques that are known in the art.

Figure 3:
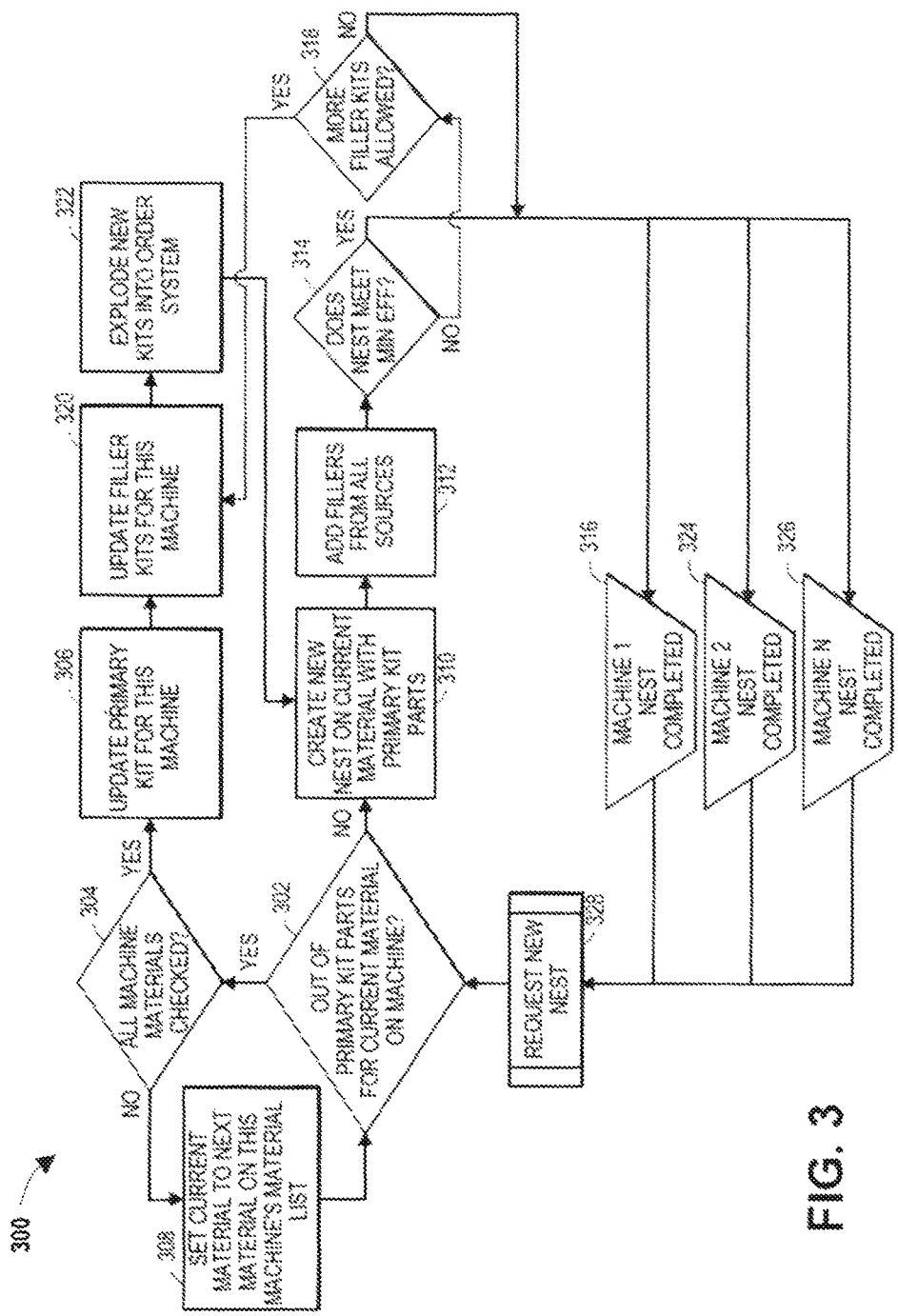
FIG. 3 is a flow diagram of an exemplary process flow of embodiments of the invention.

In more detail, and with reference to the exemplary process flow 300 of FIG. 3, an exemplary process of embodiments of the present invention is provided. As previously described, kits are processed on a machine or group of machines basis. In the present example, if a manufacturing facility has three machines, each capable of producing individual parts, then kits that are associated with, or that can be created by, each of the three machines are tracked for each machine independently. In addition, however, parts for the kits are nested on a material basis. Thus, regardless of whether a machine or group of machines can process multiple materials, each nest is based only on the type of material that is currently selected for production on the machine or group of machines.

To begin part production on a first machine of the three machines, embodiments determine whether there are any primary kit parts that need to be produced from the raw material currently selected on the first machine 302, If there are no primary kits parts to be made from the current raw material, then embodiments determine whether there are any primary kit parts from any other raw materials that can be processed by the first machine 304, if there are no primary kit parts from any material, then the primary kit is closed and the highest priority subordinate kit is promoted to the primary kit 306. In situations where there are currently no subordinate kits associated with the particular machine or groups of machines, unconsidered kits with parts capable of being produced on the machine or groups of machines may be promoted to a subordinate kit and/or directly to a primary kit. For the newly promoted primary kit, the process for determining whether primary kit parts are available is repeated. If primary kit parts are not found for a selected material, then embodiments of the present invention determine whether there are any primary kit parts for any other raw material capable of being produced on the machine requesting the nest 306. Once a material has been found that includes primary kit parts that need to be created, then embodiments of the present invention set the selected material to a secondary or "next" material on the machine's material list if required, as shown in block 308, and create a nest for the selected material using a nesting algorithm 310, Using the nesting algorithm, primary kit parts are nested on the selected material until no additional primary kit parts can be added to the nest. Once no additional parts from the primary kit can be nested, embodiments of the present invention analyze parts from the subordinate kits and filler kits to be nested along with the parts from the primary kit 312. Parts from the highest subordinate kit are nested first until no additional parts from the highest subordinate kit can be nested. Thereafter, parts from the next highest kit are nested, and the process continues on down to the lowest priority open subordinate kit. After all of the subordinate kits have been analyzed, then the filler kits are analyzed to determine whether any filler kit parts can be added to the nest.

Once all of the subordinate and filler kits have been processed, the nest is checked for material efficiency 314. If the nest meets a minimum material efficiency, then the nest is routed to the first machine and the parts are produced 316. If the nest does not meet the minimum material efficiency, then embodiments of the present invention determine whether any unconsidered kits can be promoted to subordinate kits 318. As described above, unconsidered kits can only be promoted if the number of open kits is below the maximum allowable number of kits established for the first machine. If the number of open kits is below the maximum allowable number, then an unconsidered kit can be promoted 320, and embodiments of the present invention can analyze whether any parts from the newly promoted subordinate kit can be added to the nest 322. Nests for a second machine 324 up to Machine N 326 can be prepared in the same way. This process is repeated by requesting a new nest 328 and filling the nest until the nest achieves the minimum material efficiency 314, the maximum allowable number of open kits is reached 318, or there are no additional unconsidered kits to promote. Upon the occurrence of any of these situations, the nest is sent to the first machine for processing and production.

Figure 4:
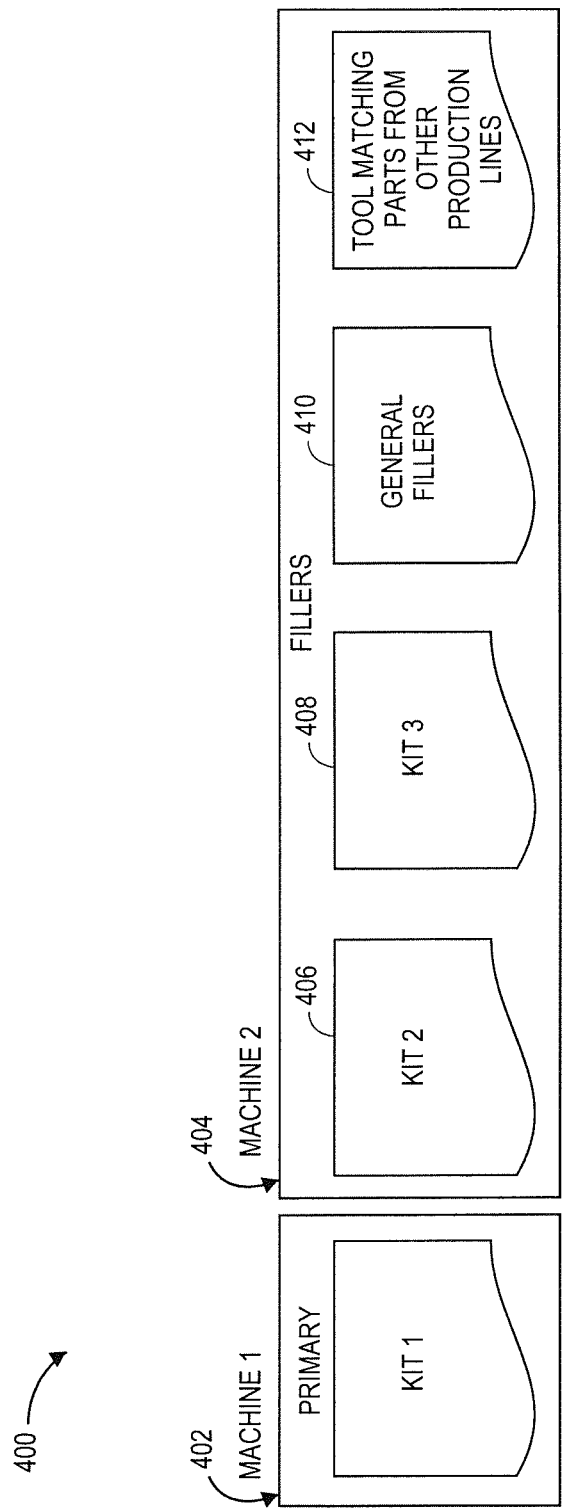
FIG. 4 is block diagram of an exemplary process of an embodiment of the invention utilizing subsequent priority kits on different machines as fillers.

Embodiments of the present invention contemplate further efficiency increases, as shown by exemplary machine setup 400 of FIG. 4, by adding kits from other machines 404 or groups of machines as filler kits for the first machine 402. For instance, a subordinate kit 406 allocated to a second machine may be added as a filler kit to the first machine 402. In such an example, the parts from the filler kit from the second machine 404 is analyzed to determine whether the cost savings associated with producing the parts on the first machine outweighs the material handling cost necessary to sort, handle, and deliver or transfer the parts back to the second machine once the parts have been produced by the first machine 402. Depending on factors such as part size, part weight, and material cost, a monetary savings amount can be determined and compared to an efficiency threshold. If the savings exceeds the threshold, then the kit 406 can be added as a filler kit and those parts meeting the cost savings threshold can be produced by the first machine, Additional filler kits such as kit 408 and general filler kits 410, and any parts that match tool requirements from other production lines 412, can then be added in that order or in any other suitable order.

In summary, embodiments of the present invention include a process of blending parts across multiple kits to efficiently manage and produce parts from a plurality of kits. The number of parts that need to be produced for primary kits may start off very large, but as the production of the kits begins to be completed, there are correspondingly fewer and fewer parts to be produced. Thus, because there are fewer parts to produce, there are fewer parts to nest, and in many instances a tail-off will occur, resulting in unused material. Such unused material is generally passed off as waste or managed as remnant, which severely impacts efficiency. However, in embodiments of the present invention, once the number of primary kit parts begins to diminish, such that there are fewer parts to nest on raw materials, parts from subordinate or filler kits can be nested and blended with the primary kit parts to create efficient nets. Therefore, material efficiency can be optimized.

In addition, the method described above can be used and integrated across multiple machines and product lines, such that manufacturing facilities with very large numbers of machines, groups of machines, and product lines can dynamically manage, correlate, and integrate production requirements to optimize kit production and material efficiencies. Even further, embodiments of the present invention can be implemented across multiple machines or product lines that use different tooling and preparation requirements. For instance, embodiments of the present invention can be implemented simultaneously on machines that have static tooling and machines whose tooling is dynamically allocated on a per nest basis.

Although the invention has been described with reference to the preferred embodiment(s), it is noted that equivalents may be employed and substitutions made herein without departing from the scope of the invention. Thus, the invention described herein is entitled to those equivalents and substitutions that perform substantially the same function in substantially the same way.

The invention claimed is:

1. A method for optimizing kit nesting for a plurality of kits, wherein each kit is comprised of one or more parts of at least one product, wherein the parts are grouped based at least on one of product type, due data, material, and common tooling, wherein a machine is limited by manufacturing capability factors, wherein a machine family is comprised of one or more machines having the same manufacturing capability factors, wherein an optimized nest is an optimal arrangement of parts provided to and determined by a nesting engine, the method comprising the steps of:

defining a priority level for each kit in a plurality of kits, wherein the plurality of kits have a sequential priority, such that among the plurality of kits there is a highest priority kit, one or more subsequent priority kits, and a lowest priority kit;

associating each of the plurality of kits with at least one machine in a machine family, such that each machine family is associated with a set of kits;

determining a first optimized nest for each machine in each machine family, wherein the first optimized nest for each machine in each machine family is determined by providing all machine-compatible parts in the highest priority kit to a nesting engine to be optimally arranged on a first nest, wherein once all machine-compatible parts from the highest priority kit that can be optimally arranged on the first nest have been optimally arranged, allowing the nesting engine access to one or more machine-compatible parts from subsequent priority kits to be optimally arranged into said first nest;

determining a second optimized nest for at least one machine, wherein the second optimized nest is determined by providing all remaining machine-compatible parts in the highest priority kit to a nesting engine to be optimally arranged on a second nest, wherein once all remaining machine-compatible parts from the highest priority kit that can be optimally arranged on the second nest have been optimally arranged, allowing the nesting engine access to one or more machine-compatible parts from subsequent priority kits to be optimally arranged into said second nest;

once no parts from subsequent priority kits can be nested, identifying a subordinate kit from another machine as a potential filler kit for the at least one machine;

performing a cost saving analysis on producing parts from the potential filler kit, the cost saving analysis including determining whether cost savings associated with producing parts from the filler kit on the at least one machine minus material handling costs associated with producing parts from the filler kit on the at least one machine exceeds a predetermined efficiency threshold;

if the cost savings minus the material handling costs exceeds the predetermined efficiency threshold, adding the potential al filler kit as a filler kit to be produced by the at least one machine;

nesting parts from the filler kit into the second nest;

opening an unconsidered kit if a number of open kits falls below a minimum allowable number of open kits, wherein unconsidered kits include kits not being considered by one of the machines and open kits include kits being considered by one of the machines;

not opening unconsidered kit if the number of open kits has reached a maximum number of allowable open kits;

optimizing the first and second nests in real time according to production factors including completions, cancelations, revisions, part availability, material availability, tooling availability, and machine states;

dynamically integrating the kit nesting optimization across a number of machine families and product lines such that kits are promoted to an available machine in one of the machine families, wherein at least two of the machine families use different tooling and have different preparation requirements.

2. The method of claim 1, further comprising the step of:
requesting the second optimized nest for at least one machine, wherein the request for the second optimized nest can be made at any time during a manufacturing cycle, wherein the request for the second optimized nest is initiated by the at least one machine upon reaching a predetermined completion percentage of manufacturing the first optimized nest on said at least one machine.

3. The method of claim 1, further comprising the step of:
requesting the second optimized nest for at least one machine, wherein the request for the second optimized nest can be made at any time during a manufacturing cycle, wherein the request for the second optimized nest is initiated by an operator of the at least one machine.

4. The method of claim 1, wherein the first optimized nest and the second optimized nest are determined before a manufacturing cycle begins on the first optimized nest.

5. The method of claim 1, wherein the determining of the first and second optimized nest further considers compatibility with a material, wherein if no parts of the highest priority kit are compatible with a material currently selected for production, then a material best suitable for producing parts of the highest priority kit is selected.

6. The method of claim 1, wherein during the determination of the first and second optimized nest, the nesting engine may only access subsequent priority kits after all available machine-compatible parts from the highest priority kit that can currently fit on the nest have been exhausted.

\* \* \* \* \*